UNITED STATES PATENT OFFICE.

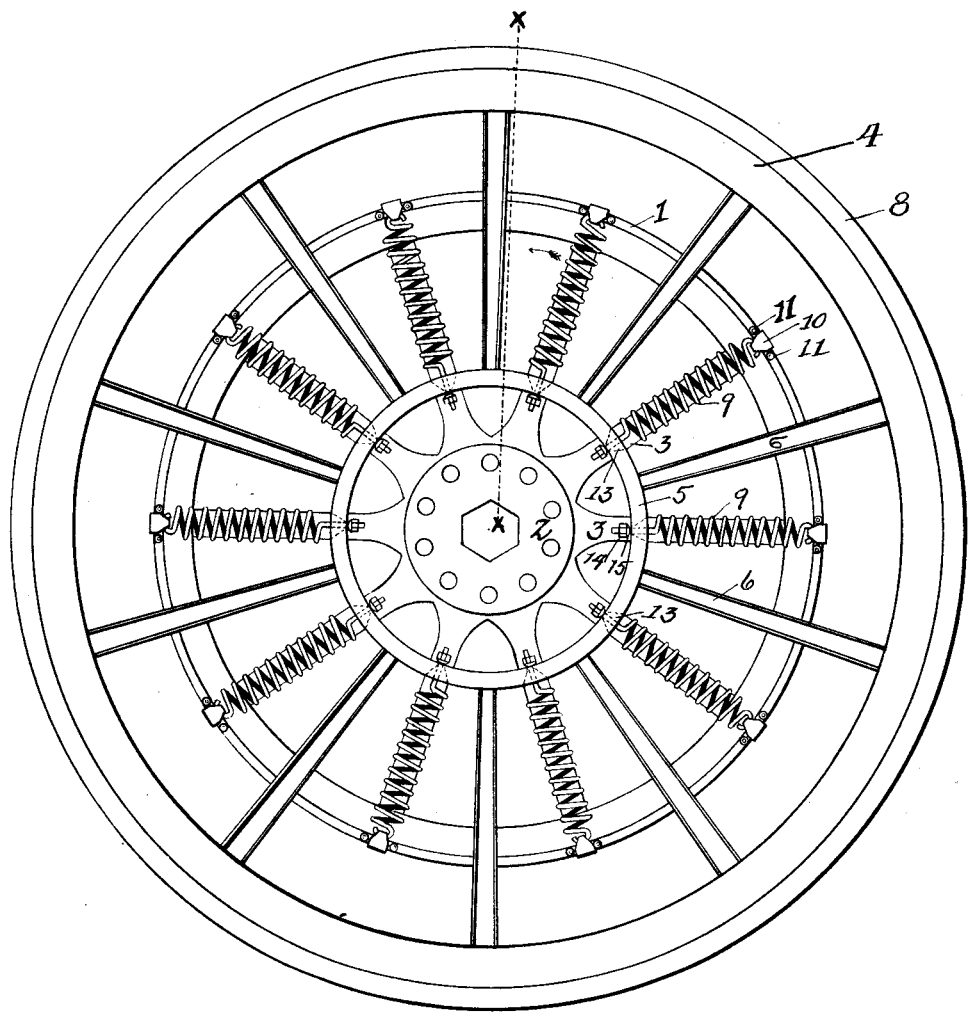

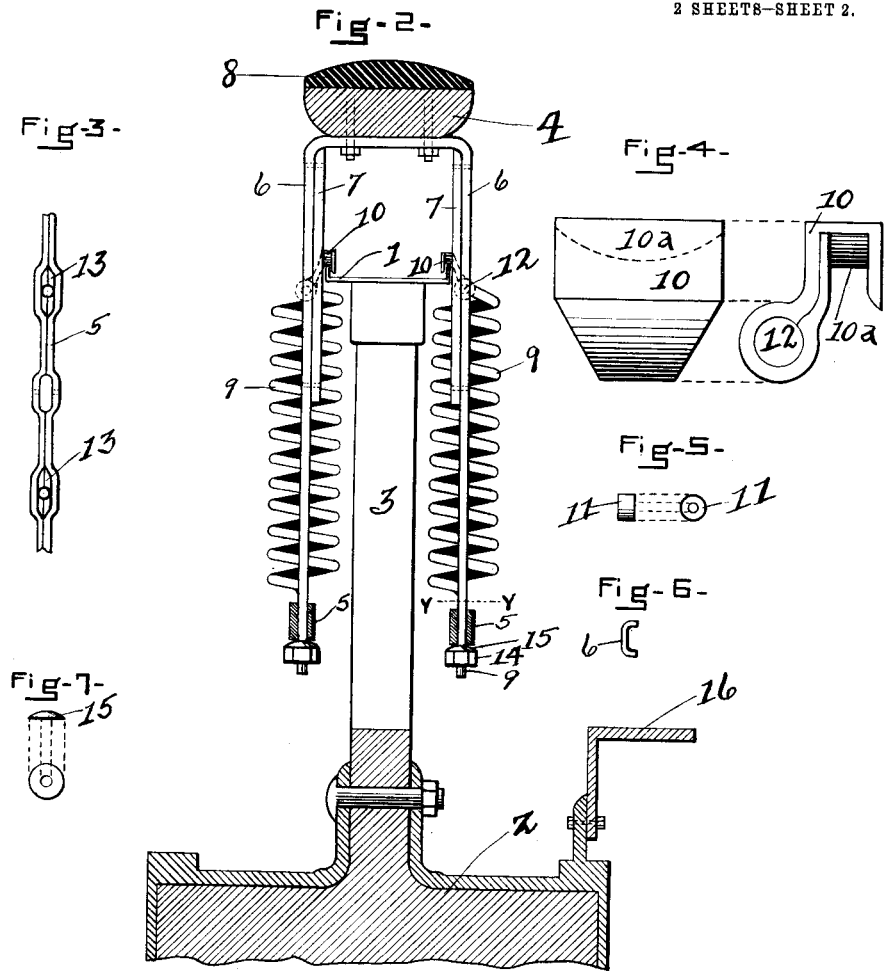

WALTER WHEELER, OF DES MOINES, IOWA.

RESILIENT WHEEL.

1,076,254.  Specification of Letters Patent.  Patented Oct. 21, 1913.

Application filed June 6, 1913. Serial No. 772,083.

*To all whom it may concern:*

Be it known that I, WALTER WHEELER, citizen of the United States, residing at Des Moines, in the county of Polk and State of Iowa, have invented certain new and useful Improvements in Resilient Wheels, of which the following is a specification.

This invention relates to improvements in resilient tires and wheels and more specifically to radial spring wheels.

The object of my invention is to provide a resilient wheel for automobiles and trucks which may be easily and quickly assembled, simple in construction, effective in operation, and durable, in that it saves the wear on tires, allows the use of a solid rubber tread instead of the expensive pneumatic tread and at the same time gives the same resiliency as the pneumatic tread.

With the above and other objects in view, my invention consists in the combination, arrangement, and details of construction disclosed in the drawings and specifications, and then, more particularly pointed out in the appended claims.

Referring to the drawings, wherein similar reference characters designate similar parts throughout the respective views, Figure 1 is a side elevation of my resilient wheel, while Fig. 2 is a fragmental cross-sectional elevation of the spoke and spring arrangement thereof taken on the line *x—x* Fig. 1, looking in the direction of the arrow. Fig. 3 is a fragmental detail view of one of the inner rings to which spring members are attached. Fig. 4 is a side and front view of the rocker seated spring hanger, while Fig. 5 is a front and side elevation of a washer for holding spring hangers in position and to act as a buffer for same. Fig. 6 is a cross-sectional detail view of the preferred type of channel steel spoke for my wheel, while Fig. 7 is a side and bottom elevation of half-oval washer interposed between inner ring and screw nut in securing springs.

Referring to the drawings, which are merely illustrative of my invention, 1 designates the U-shaped rim of my wheel which is rigidly secured to the hub 2 by spokes 3 interposed radially between said hub and said rim. An outer rim 4 is spaced apart around U-shaped rim 1, and is rigidly mounted upon inner rings 5 by interposing between said outer rim and said inner rings U-shaped spokes 6, made preferably of channel steel. A relatively soft and tough friction member 7, preferably of sole-leather, is secured to either side of the inner surface of said U-shaped spokes 6 to act as a buffer between the U-shaped rim 1 and the inside of said spokes 6 when the oscillation of the wheel members would otherwise cause a metallic friction. Said strips 7 may be secured to the outside of inner rim 1 and perform its function equally well. Strips 7 also tend to hold wheels in proper alinement. A tire 8, preferably of solid rubber, is mounted around outer rim 4 to serve as a tread.

Resiliency in my novel wheel is secured by interposing cylindrical springs 9 between the U-shaped rim 1 and the inner rings 5. I accomplish this by hooking over the outside of each upright arm of U-shaped rim 1 the hook portion of a spring hanger 10 which has a rocker seat 10$^a$ permitting of a rocker motion and thereby adding to its durability and adaptability to ever-changing degrees of pressure and tension. Said spring hangers 10 are spaced apart around said rim 1 so that the springs 9 hung thereupon will be ranged in pairs radially around the wheel, preferably directly opposite and on either side of spokes 3. Upon either side of the spring hanger 10, and fixedly secured to the upwardly extending arms of U-shaped rim 1 are washers 11 preferably of sole-leather, which serve as buffers for U-shaped spokes and also hold said spring hangers in position. One end of springs 9 is formed into a hook which passes through an opening 12 of hanger 10, while the other end passes through wedge-shaped opening 13 of inner rings 5 which permits free play of the springs in operation, they being so held in position preferably by forming a screw thread upon the end of the spring member 9 and fastened by a nut 14 screwed thereupon against the flat side of a half-oval washer 15 interposed to permit a rocker motion to inner ends of springs. The springs 9 are so hung with relation to the hub 2 as not to interfere with the brake drum 16 secured to the inner side of said hub.

Having now described and pointed out the new and useful features of my invention, I do not limit myself to the shape of certain parts where the shape is not essential, as to a U-shaped rim, channel-steel U-shaped spokes, etc., nor do I restrict myself to the exact details of construction shown and described, but mean and intend to claim all equivalents and variations thereof not departing in principle from my invention and falling within the purview of the appended claims.

I claim as my invention:

1. In a wheel, in combination, two series of circumferentially extending cylindrical springs, means for hanging said springs from the rim of said wheel, means for keeping said last named means in position upon said rim, a hub, spokes extending radially from said hub to said rim, a tread rim spaced apart around said wheel, inner rings, U-shaped spokes rigidly interposed between said inner rings and said tread rim, and said springs secured at their inner end to said rings.

2. In combination, an inner rim, an outer rim, a hub, said inner rim being rigidly secured to said hub, a plurality of hooks, said hooks being hung upon said inner rim spaced apart, a plurality of springs suspended from the free end of said hooks, and means whereby said outer rim is supported by said springs.

3. In combination, an inner rim, said inner rim being U-shaped, an outer rim, said outer rim spaced apart from said inner rim, a hub, an inner ring on either side of said hub, said inner rim being rigidly secured to said hub, a plurality of springs suspended upon each arm of said U-shaped inner rim, said springs being spaced apart around said inner rim, means for attaching said springs to said inner rings, and spokes rigidly interposed between said inner rings and said outer rim.

4. In combination, an inner rim, said inner rim being U-shaped, an outer rim, said outer rim spaced apart from said inner rim, a hub, an inner ring on either side of said hub, said inner rim being rigidly secured to said hub, hook members, said hook members having a rocker seat, being spaced apart around said inner rim and on either side and opposite to the spokes thereof, a plurality of springs suspended from the free end of said hook members and rockingly engaged through said inner rings by means of a half-oval washer interposed between the inner surface of said inner rings and a nut screwed upon the end of said springs.

In testimony whereof I affix my signature in presence of two witnesses.

WALTER WHEELER.

Witnesses:
W. J. Seeger,
L. E. Varner.

Copies of this patent may be obtained for five cents each, by addressing the "Commissioner of Patents, Washington, D. C."